United States Patent

Katsuda et al.

Patent Number: 6,116,643
Date of Patent: Sep. 12, 2000

[54] COOLANT/FILTER FOR AIR BAG GAS GENERATOR

[75] Inventors: Nobuyuki Katsuda; Yoshihiro Nakashima, both of Himeji, Japan

[73] Assignee: Daicel Chemical Industries, Ltd., Osaka, Japan

[21] Appl. No.: 08/862,425

[22] Filed: May 23, 1997

[30] Foreign Application Priority Data

May 15, 1997 [JP] Japan .................................. 9-125141

[51] Int. Cl.⁷ .................................................. B60R 21/26
[52] U.S. Cl. ............................ 280/741; 55/525; 280/736; 280/742
[58] Field of Search .................................. 280/741, 736, 280/742, 740; 55/498, 525

[56] References Cited

U.S. PATENT DOCUMENTS

| | | | |
|---|---|---|---|
| 4,871,380 | 10/1989 | Meyers | 55/380 |
| 5,478,112 | 12/1995 | Knobloch | 280/741 |
| 5,547,638 | 8/1996 | Rink et al. | 280/736 |
| 5,564,743 | 10/1996 | Marchant | 280/741 |
| 5,624,133 | 4/1997 | Wong | 280/740 |
| 5,799,973 | 9/1998 | Bauer et al. | 280/741 |
| 5,845,934 | 12/1998 | Armstrong, III | 280/742 |

FOREIGN PATENT DOCUMENTS

| | | | |
|---|---|---|---|
| 3742383 | 6/1989 | Germany | 280/736 |

*Primary Examiner*—Eric Culbreth

[57] ABSTRACT

A gas generator for an air bag has a coolant/filter that includes at least two circular cylindrical filter units juxtaposed in the axial direction of the gas generator. Each filter unit is made by compression molding a metallic wire mesh, prepared by knitting a metallic wire, into a circular cylindrical configuration. By using at least two circular cylindrical filter units, the weight and density of the coolant/filter, along the entire length thereof, can be made even to enhance even cooling and purification.

11 Claims, 7 Drawing Sheets

COOLANT/FILTER FOR AIR BAG GAS GENERATOR

FIELD OF THE INVENTION

The present invention relates to a coolant/filter used in a gas generator for air bag intended to protect a passenger from an impact and, more particularly, to a coolant/filter used in a gas generator for air bag usable in a gas generator for air bag which is relatively long in the axial direction.

DESCRIPTION OF THE RELATED ART

In order to protect a passenger from an impact that occurs at a time of collision, an air bag system is mounted on a vehicle, for example, an automobile. When a sensor senses an impact, this air bag system operates a gas generator to form a cushion (air bag) between the passenger and the vehicle.

In this gas generator, by an impact sensor sensing an impact, igniting means is operated to cause gas generating means to burn and generate a combustion gas, whereby this combustion gas is purified and cooled by a coolant/filter before being jetted from the gas generator (i.e., before allowing to flow into the air bag). As this coolant/filter, for example, a wire mesh filter obtained by winding a strip-like wire mesh in a multiplex form into a cylindrical configuration is conventionally used, and during a time period in which the combustion gas generated within a combustion chamber of the gas generator passes through this coolant/filter, cooling of the combustion gas is performed and catching of relatively large size combustion residues is also performed.

On the other hand, since the above-mentioned gas generator is incorporated into an optimum position of the vehicle body such as a steering wheel and the interior of a dash board with a passenger's safety taken into consideration, it is required that the gas generator be optimum to each incorporation position in terms of the amount of gas generated, the entire volume, the configuration or operational characteristic.

Especially, in a case where the configuration of the gas generator for air bag is limited to the configuration of its being longer in the axial direction because of a limitation imposed on the accommodation space of a position where the air bag is installed, etc., a coolant/filter suitable for use in such configuration is required.

As a case where the configuration of the gas generator for air bag is limited as mentioned above to a configuration of its being longer in the axial direction, there is, for example, a case where the air bag system is disposed on a passenger's seat side. Since in almost all cases the air bag system containing the conventional gas generator for air bag for a passenger's seat is accommodated inside a dash board on the passenger's seat side, the gas generator for air bag, the configuration of which is relatively long in the axial direction by using a cylindrical housing formed with gas discharge ports in the axial and circumferential direction of the circumferential wall thereof, is used.

However, in the gas generator for an air bag that is long in the axial direction, in a case where the coolant/filter is the above-mentioned conventionally used wire mesh, i.e., a wire mesh obtained by winding up a strip-like wire mesh into a circular cylindrical configuration and thus into a desired configuration, although the configuration thereof can be set freely, since the weight density is determined according to the wire mesh density, in order to adjust this weight density a wire mesh wherein the wire diameter and wire meshes are adjusted beforehand must be separately prepared. Also, according to the density of the wire mesh, the problem that the spatial portions (meshes) of the wire mesh are inconveniently passed through the cylinder from the inside to the outside thereof and the gas flow is concentrated thereinto occurs, with the result that cooling and purification of the combustion gas are unevenly performed and as a result, efficient cooling and purification cannot be performed.

Accordingly, the present invention has been made in order to solve the problems inherent to the conventional wire mesh filter and an object thereof is to provide a coolant/filter for use in a gas generator for air bag, wherein the density/weight adjustment of the coolant/filter used in the gas generator for air bag having a configuration relatively longer in the axial direction is performed, for example, by a filter obtained by compression molding a wire mesh which was not conventionally used, as a single filter unit and juxtaposed in the axial direction, and further the freedom in configuration can be made wide.

SUMMARY OF THE INVENTION

The coolant/filter of the gas generator for air bag according to the present invention has a feature of being composed of two or more filter units of a circular cylindrical configuration which are placed next to one another in the axial direction thereof. As this filter unit, for example, a wire mesh obtained by a knitted wire, which is compression molded into a circular cylindrical configuration, can be used. Preferably, short-pass preventing means is provided at a joined surface between the filter units. This short-pass preventing means is intended to prevent the generated gas from leaking from the joined surface between the adjacent filter units placed next to one another in the axial direction thereof. As this short-pass preventing means, for example, a ring-shaped graphite seal disposed between the filter units placed next to one another in the axial direction, a retainer closing the joining surface between the filter units placed next to one another in the axial direction, and an interfitting structure in which an end of each filter unit is formed to fit an end of an adjacent filter unit to place the filter units next to one another in the axial direction, etc. can be used.

Also, preferably, two or more filter units placed next to one another in the axial direction are joined by joining the filter units adjacent to each other by welding. The coolant/filter formed in this way preferably has a ratio (L/D) of the length L to the inside diameter D not smaller than 1. The filter units adjacent to each other can be integrated together by joining together by welding. Various welding methods such as electron beam welding, laser welding, tig welding, projection welding, etc. can be used.

The coolant/filter is accommodated within the housing and performs the function of eliminating the combustion residues produced by combustion of the gas generating means as well as of cooling the combustion gas.

The filter unit constituting the coolant/filter of the present invention can be formed, for example, as follows.

That is, the filter unit constituting of the coolant/filter of the present invention can be formed by a wire mesh obtained by forming a knitted wire (desirably, a stainless steel made wire mesh) into a circular cylindrical member and repeatedly bending one end portion of this circular cylindrical member to the outside to form an annular multi-layer element, which is then compression molded within a mold. Or it can be obtained by forming a mesh made of a knitted wire (desirably, a stainless steel made wire mesh) into a circular cylindrical member, and pressing it in a radial direction to form a plate member. Then, the plate member is wound in a multiplex form into a cylindrical member to form a multi-layer element, and compression molded within a mold. According to these forming methods, since the winding is performed such that the surface of the circular cylindrical member is brought to an end surface of the filter unit, there is no possibility that the cut-off portion of the wire mesh is exposed to this end surface and accordingly there is no possibility that the fingers are injured by the cut-off portion. The stainless steel made wire mesh has a wire diameter of, for example, 0.3 to 0.6 mm and has a mesh structure of plain knit. As illustrated in FIG. 9, the plain knit structure is one wherein all meshes are drawn out in one direction to thereby form loops and the filter unit obtained by radially laminating the wire mesh having this mesh structure. The filter unit obtained by compression molding such material has a wire mesh whose wire diameter is in a range of from 0.3 to 0.6 mm and has a bulk density of 3.0 to 5.0 g/cm$^3$, preferably 3.5 to 4.5 g/cm$^3$ and has, at normal temperature, a pressure loss of $0.5 \times 10^{-2}$ to $1.2 \times 10^{-2}$ kg/cm$^2$, preferably $0.7 \times 10^{-2}$ to $0.9 \times 10^{-2}$ kg/cm$^2$ under a flow rate of 100 l/min/cm$^2$.

Although the filter unit may have an outside diameter of 40 to 65 mm, an inside diameter of 30 to 55 mm, and a length of 19 to 37.6 mm, it preferably has the outside diameter of 55 to 65 mm, the inside diameter of 45 to 55 mm and the length of 26 to 32 mm. Regarding the thickness, 5 to 10 mm is preferable.

As the stainless steel that constitutes the wire mesh material, a stainless steel, such as SUS 304, SUS 310S, SUS 316 (JIS Standard Notation) can be used. The stainless steel SUS 304 (18Cr-8Ni-0.06C) exhibits an excellent corrosion resistance as an austenite system stainless steel.

The filter unit made of the above-mentioned compressed and molded laminated wire mesh filter can have its post-molding configuration and density adjusted irrespective of the density and configuration of the wire mesh. Therefore, unlike the wire mesh filter formed simply by rolling up a wire mesh into a circular cylindrical configuration, there are merits that it is not necessary to separately prepare a wire mesh whose wire diameter and meshes are adjusted beforehand in order to adjust the weight density. Further, an incident in which the gas flow is concentrated into the spatial portions of the wire mesh inconveniently passing through the cylinder from the inside to the outside thereof, resulting in uneven cooling and purification of the generated gas can also be avoided.

However, regarding the above-mentioned multi-layered wire mesh filter (single filter unit), difficulties arise in forming the wire mesh filter having uniform bulk density, which is long in the axial direction. Therefore, when forming a gas generator for air bag by using this filter, the gas generator is limited to one which is relatively short in the axial direction with its housing having a ratio of the length L to the inside diameter D (L/D) of about 0.6 or so. Therefore, in the present invention, by using the above-mentioned filter units placed next to one another in the axial direction, a coolant/filter that is long in the axial direction is formed and, by using this coolant/filter, a gas generator for air bag is obtained. As in the case of the filter unit, this coolant/filter is comprised of a wire mesh whose wire diameter is in a range of from 0.3 to 0.6 mm and can be made to have a bulk density of 3.0 to 5.0 g/cm$^3$, preferably 3.5 to 4.5 g/cm$^3$ and have, at normal temperature, a pressure loss of $0.5 \times 10^{-2}$ to $1.2 \times 10^{-2}$ kg/cm$^2$, preferably $0.7 \times 10^{-2}$ to $0.9 \times 10^{-2}$ kg/cm$^2$ under a flow rate of 100 l/min/cm$^2$, whereby the spatial structure thereof is complex with the result that the coolant/filter has excellent catching effect and cooling effect.

By the coolant/filter having the prescribed wire diameter and prescribed bulk density, the shape retaining strength thereof is remarkably increased with the result that the deformation of the coolant/filter due to application of the gaseous pressure is avoided, and simultaneously, thinning the coolant.

The coolant/filter of the gas generator for air bag comprises, within the housing having gas discharge ports, igniting means operated by an impact sensor sensing an impact, and gas generating means ignited by the igniting means to burn and generate a combustion gas along with other suitable members that are necessary for the operation of the gas generator, thereby constituting the gas generator for air bag.

As long as the coolant/filter of the present invention is equipped, the above-mentioned gas generator for air bag includes a configuration (i.e., the housing configuration) that is suitable for an air bag system disposed on a driver's seat side, a configuration that is suitable for an air bag system disposed on a passenger's seat side, and a configuration that is suitable for an air bag system disposed with respect to a side collision.

In a case where the gas generator is made suitable for an air bag system disposed on a passenger's seat side, the housing thereof can be made to have the following configuration.

That is, the housing can be composed of a cylindrical member having a cylindrical shape and a plurality of gas discharge ports provided therein and one end side wall having a central opening, and a cup-shaped member which is substantially shaped like a cup and which is integrally formed, at a circumferential edge of the end flat surface portion thereof, with an end annulus portion mounted on the end opening of the cylindrical member. And, this housing is formed into the gas generator substantially shaped like a circular cylinder that is relatively long in the axial direction.

The cylindrical member constituting the housing is substantially shaped like a cylinder and has a plurality of gas discharge ports formed in the circumferential wall thereof and forms in one end side surface thereof a central opening for accommodating the igniting means. The other end side surface of the cylindrical member is open and this opening is closed by the cup-shaped member as later described. The gas discharge ports formed in the circumferential wall of the cylindrical member are not only formed axially in one row but these gas discharge ports can be formed axially also in two or more rows to provide the circumferential wall wherein the gas discharge ports are arranged circumferentially and axially. The central opening formed in the one end side surface can have the igniting means inserted thereinto. This central opening can be bored simply in the configuration of the igniting means but can also be bent in a direction of the cylindrical member to form an igniting means retention portion. In this case, by supporting or retaining the igniting means by an end of the igniting means retention portion bent in the axial direction, the igniting means retention portion can prevent the igniting means from moving in the axial direction of the cylindrical member. Also, the cylindrical member can be formed, on a circumferential surface thereof, with a crank-shaped portion for the formation of a swollen circumferential portion prepared by slightly swelling the circumferential wall surface radially outwardly. By forming the crank-shaped portion on the circumferential surface of the cylindrical member, it results that the circumferential wall surface of the cylindrical member is slightly swollen in the radial direction thereof.

The end opening of the cylindrical member, whose circumferential wall surface is slightly swollen in the radial direction, is closed, for example, by fitting the cup-shaped member thereinto. This cup-shaped member is composed of an end flat surface portion opposing the one end side surface of the cylindrical member and the end annulus portion integrally formed at a circumferential edge of the end flat surface portion and inserted into the end opening of the cylindrical member. In order to mount the gas generator of the present invention into the module casing, substantially at the center of the end flat surface portion of the cup-shaped member, the gas generator attaching member extending in the axial direction of the cup-shaped member can be formed. In the present invention, since the cylindrical member and the cup-shaped member can be formed separately from each other, it is possible to easily form the attaching member with respect to the cup-shaped member. Accordingly, the gas generator of the present invention can be easily manufactured by incorporating the members that become necessary in terms of the structure of the gas generator such as the igniting means, gas generating means and coolant/filter into the cylindrical member and then integrating it with the cup-shaped member provided beforehand with the attaching member.

In the housing of the above-mentioned configuration, the housing is formed by combining the cylindrical member and the cup-shaped member having the end annulus portion. Therefore, in a case where a crank-shaped portion, which is bent outwardly in the radial direction as if it protrudes in crank-shaped, is formed at the circumferential wall surface of the cylindrical member to obtain the swollen circumferential wall portion prepared by swelling a part of the circumferential wall surface by the crank-shaped portion, and the end annulus portion of the cup-shaped portion is inserted or fitted into the inside of the end opening, the end annulus portion can function as a spacer for providing a gap between the coolant/filter accommodated within the housing and the circumferential wall of the cylindrical member. In this case, it is preferable that the inner surface of a portion of the circumferential wall surface where it is not swollen be flush with the inner surface of the end annulus portion of the cup-shaped member by, for example, swelling the circumferential wall of the cylindrical member by an amount corresponding to the thickness of the end annulus portion of the cup-shaped member. Also, it is preferable that the size of the end side surface of the cylindrical member and the size of the end flat surface portion of the cup-shaped member are regulated such that the swollen circumferential wall surface becomes parallel with the axis of the cylindrical member. As a result, the gap between the coolant/filter and the circumferential wall of the cylindrical member can be maintained constant.

It is to be noted that in a case where, in the present invention, the swollen circumferential portion of the cylindrical member is inserted or fitted into the inside of the end annulus portion of the cup-shaped member, it is also possible to provide a separate spacer in order to provide the gap between the coolant/filter accommodated within the housing and the circumferential wall of the cylindrical member. In this case, also, as in the case of using the end annulus portion of the cup-shaped member as a spacer, in order to ensure that the gap is constant, it is preferable that the inner surface of the circumferential wall surface and the inner surface of the spacer be flush with each other and the swollen circumferential wall surface be parallel with the axis of the cylindrical member.

The cylindrical member and the cup-shaped member can be respectively formed by press molding as well as by casting or forging. Especially, in a case where the cylindrical member is formed by press molding, it becomes easy to form the crank-shaped portion in the circumferential wall thereof. Press molding of the cylindrical member and the cup-shaped member can be performed by using, respectively, metal plates each having a thickness of 1.2 to 3.0 mm. As this metal plate, any one of a stainless steel plate, nickel-plated steel plate and aluminum alloy plate can be used, or in place of a stainless steel plate a steel plate, having nickel plated thereon can be used. The cylindrical member and cup-shaped member formed by, for example, press molding can be integrated with each other, followed by bonding each other. This bonding can be performed by, for example, electron beam welding, laser welding, tig welding or projection welding.

In a case where forming the gas generator by the use of the coolant/filter of the present invention, it is possible to dispose this coolant/filter in such a way that an outer periphery thereof opposes the inner surface of the circumferential wall of the circular cylindrical member to form a gap between the two. As a result, the gap functions as the gas flow passage to enable the passage of the generated gas through the coolant/filter as a whole and this makes it possible to effectively cool and purify the combustion gas.

Also, when the present coolant/filter is accommodated within the housing, it is preferable that the present coolant/filter has its outer periphery abutting and supported by expansion preventing means. The expansion preventing means that is referred here is means for reliably retaining (particularly, even at a time when the gas generator is operated) the gap between the coolant and the housing. As such means, there is, for example, a punching plate shaped like a perforated circular cylinder wherein two or more rows of through holes, prepared by disposing through holes in the circumferential wall in the circumferential direction thereof. When the expansion preventing means is the punching plate, by mating the filter units of the coolant/filter to abut at a position where no rows of through holes of the punching plate are formed, it is possible to prevent the combustion gas from leaking from the abutting position of the filter units. As this expansion preventing means, in addition to the punching plate, it is also possible to use a wire mesh layer, comprised of a multi-layered wire mesh member, disposed around the coolant/filter. This wire mesh layer prevents the expansion of the coolant so that at a time when the gas generator is operated, the coolant does not expand due to the gaseous pressure and closes the gap between the coolant and the housing.

Further, the coolant/filter can be made into a two-layer structure composed of the coolant/filter itself comprising a wire mesh whose diameter is 0.3 to 0.5 mm and an inner wire mesh layer comprising a wire mesh whose diameter is 0.5 to 0.6 mm and having a thickness of from 1.5 to 2.0 mm. The inner layer has a function of protecting the coolant/filter from the flame of the igniting means jetted with respect to the coolant/filter and from the combustion gas of the gas generating means burned upon ignition by this flame.

Additionally, regarding the system of sensing the impact and operating the igniting means, the gas generator for air bag of the present invention may be any one of the mechanical ignition type gas generator wherein the igniting means is operated by an impact sensor that senses an impact solely by the use of a mechanical constitution to cause the generation of a gas, and the electrical ignition type gas generator wherein the igniting means is operated by an electric signal transmitted from an impact sensor having sensed an impact to cause the generation of a gas.

In the mechanical ignition type gas generator that utilizes the mechanical ignition type igniting means, a mechanical sensor that senses an impact solely by the use of a mechanical constitution, such as a plunger shot by the movement of a weight, is accommodated within the housing. This housing is formed with a plurality of gas discharge ports and it is arranged that an igniting means composed of a detonator pierced through by means of a plunger shot from the mechanical sensor, thereby ignited and burned, and a transfer charge ignited and burned by the flame of the detonator, a gas generating means ignited and burned by the flame of the transfer charge to generate a gas, and a coolant/filter for cooling and purifying the gas generated are accommodated within the housing. On the other hand, the electrical ignition type gas generator, that utilizes the electrical ignition type igniting means, includes, within a housing having diffuser ports, an igniting means composed of an igniter operated by an electric signal transmitted from the sensor having sensed an impact, and a transfer charge ignited and burned by the operation of the igniter, a gas generating means ignited and burned by the flame of the transfer charge to generate a gas, and a coolant/filter for cooling and purifying the gas generated. In the mechanical ignition type or electrical ignition type gas generator, additionally, it is of course possible to suitably selectively adopt the construction that is advantageous from the viewpoint of the operational performance.

As the gas generating means used in the present gas generator, an inorganic azide, which is conventionally widely used, especially the one based on sodium azide (sodium azide) such as an equivalent mixture of, for example, azide soda and copper oxide can also be used However, from the viewpoint of safety and the like, it is more advantageous to use a non-azide based gas generating agent. Various types of compositions have hitherto been proposed as the non-azide based gas generating agent compositions and include as known compositions. For example, a composition having, as main components, a nitrogen-containing organic compound such as tetrazoles, triazoles or metallic salts thereof and an oxygen-containing oxidizing agent such as alkali metal nitrates and a composition having as fuel and nitrogen source triaminoguanidine nitrate, carbohydrazide, nitroguanidine, etc and uses as the oxidizing agent nitrates, chlorates or perchlorates of alkali metals or alkaline earth metals. Any of these compositions can be used in the present invention as the gas generating agent but the present invention is not limited thereto. Such compositions are suitably selected according to the requirements of the combustion velocity, non-toxic characteristic, and combustion temperature. The gas generating agent is used in suitable shape such as a pellet, wafer, hollow circular column or disk.

The above-mentioned gas generator for air bag is accommodated into the module casing along with the air bag expanded by introducing thereinto the gas generated from the gas generator, to thereby form an air bag system. This air bag system also contains therein an impact sensor that senses an impact to operate the gas generator. In a case where the gas generator is a mechanical ignition type gas generator, this impact sensor corresponds to a mechanical sensor, which is accommodated into the housing along with the igniting means. On the other hand, in a case where the gas generator is an electrical ignition type gas generator, the impact sensor is, for example, the semiconductor type acceleration sensor disposed outside a console box. This semiconductor type acceleration sensor has four semiconductor distortion gauges formed on the beam constituted by a silicon substrate and so arranged that when an acceleration is applied thereto the beam may be flexed, these semiconductor distortion gauges being bridge connected. When an acceleration is applied, the beam is flexed with the result that distortion occurs in the surface. Due to the occurrence of this distortion, the resistance of the semiconductor distortion gauge varies and this variation in resistance is detected as a voltage signal that is proportional to the acceleration. Especially, in a case where using an electrical ignition type gas generator as the gas generator, the air bag system can further contain a control unit disposed outside the module casing. This control unit is equipped with an ignition determining circuit, whereby it is arranged such that to this ignition determining circuit there is input a signal from the semiconductor type acceleration sensor. At a point when the impact signal from the sensor exceeds a certain value, the control unit starts to perform its calculation and, when the calculation result exceeds a certain value, an operation signal is output to the gas generator.

In this air bag system, the gas generator is operated in interlocking relation with the sensing of an impact by the impact sensor and discharges a combustion gas from its gas discharge ports. This combustion gas is jetted into the air bag, whereby the air bag breaks the module cover and is expanded to form a cushion between a hard structure within the vehicle and a passenger which serves to absorb the impact.

DETAILED DESCRIPTION OF THE PREFERRED EMBODIMENTS

An embodiment of the present invention will now be explained with reference to the drawings.

Figure 1:
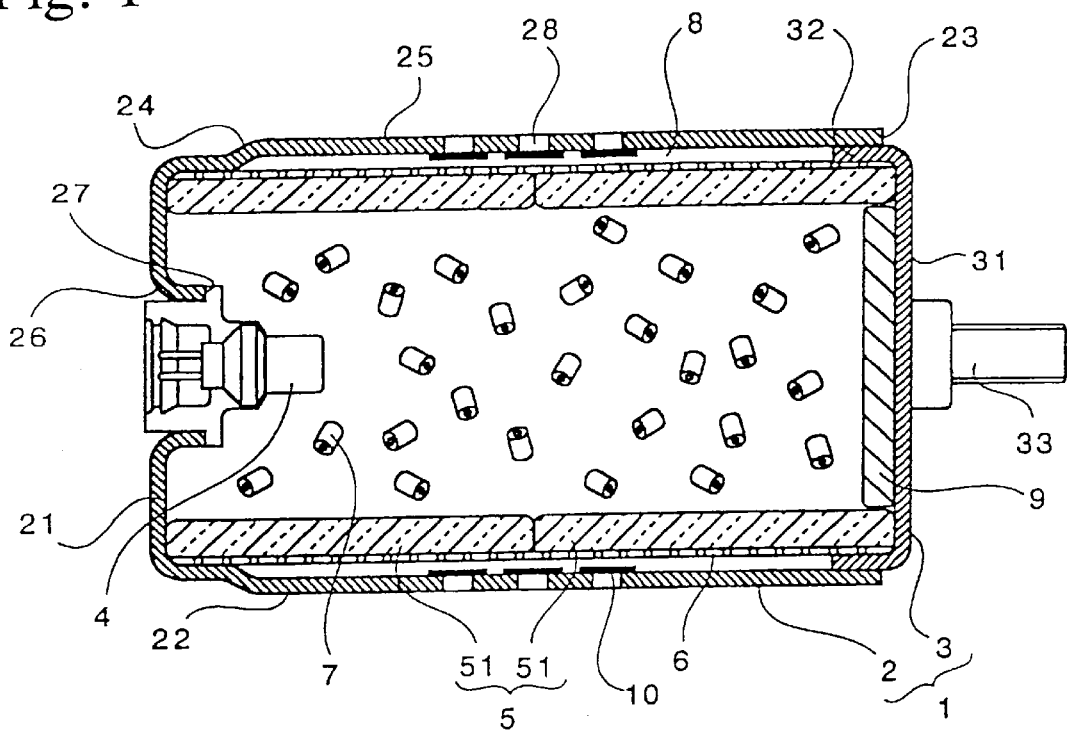
FIG. 1 is a longitudinal sectional view illustrating a gas generator for air bag using a coolant/filter of the present invention.
Figure 2:
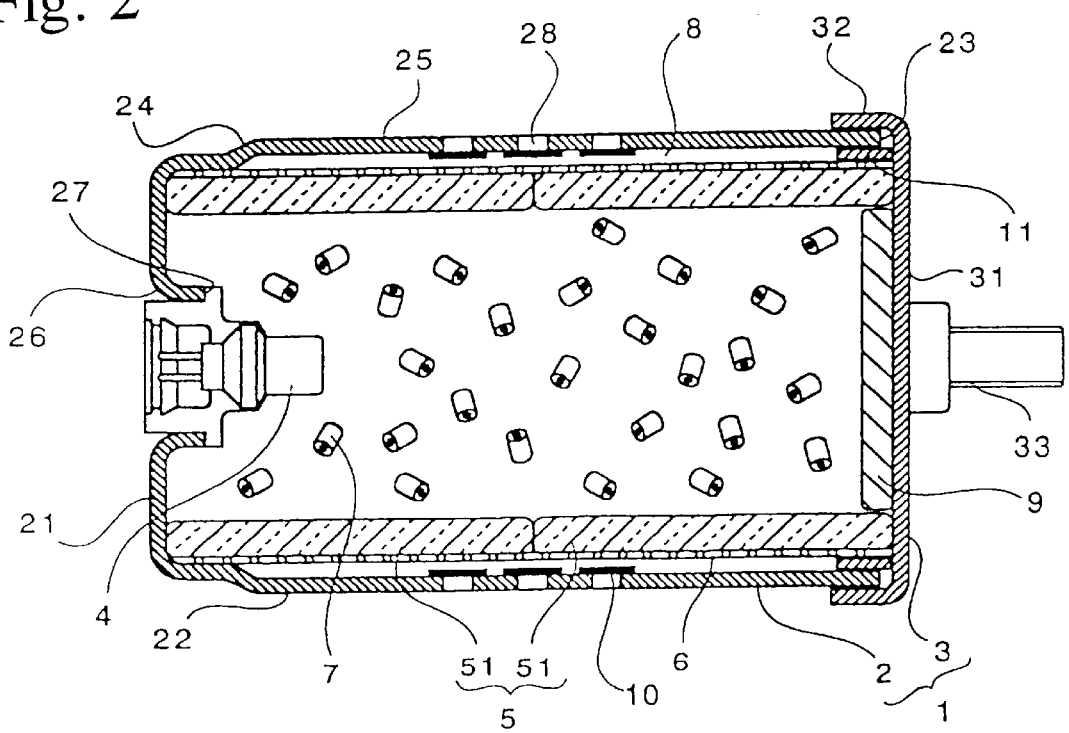
FIG. 2 is a longitudinal sectional view illustrating a gas generator for air bag using the coolant/filter according to another embodiment of the present invention.
Figure 3:
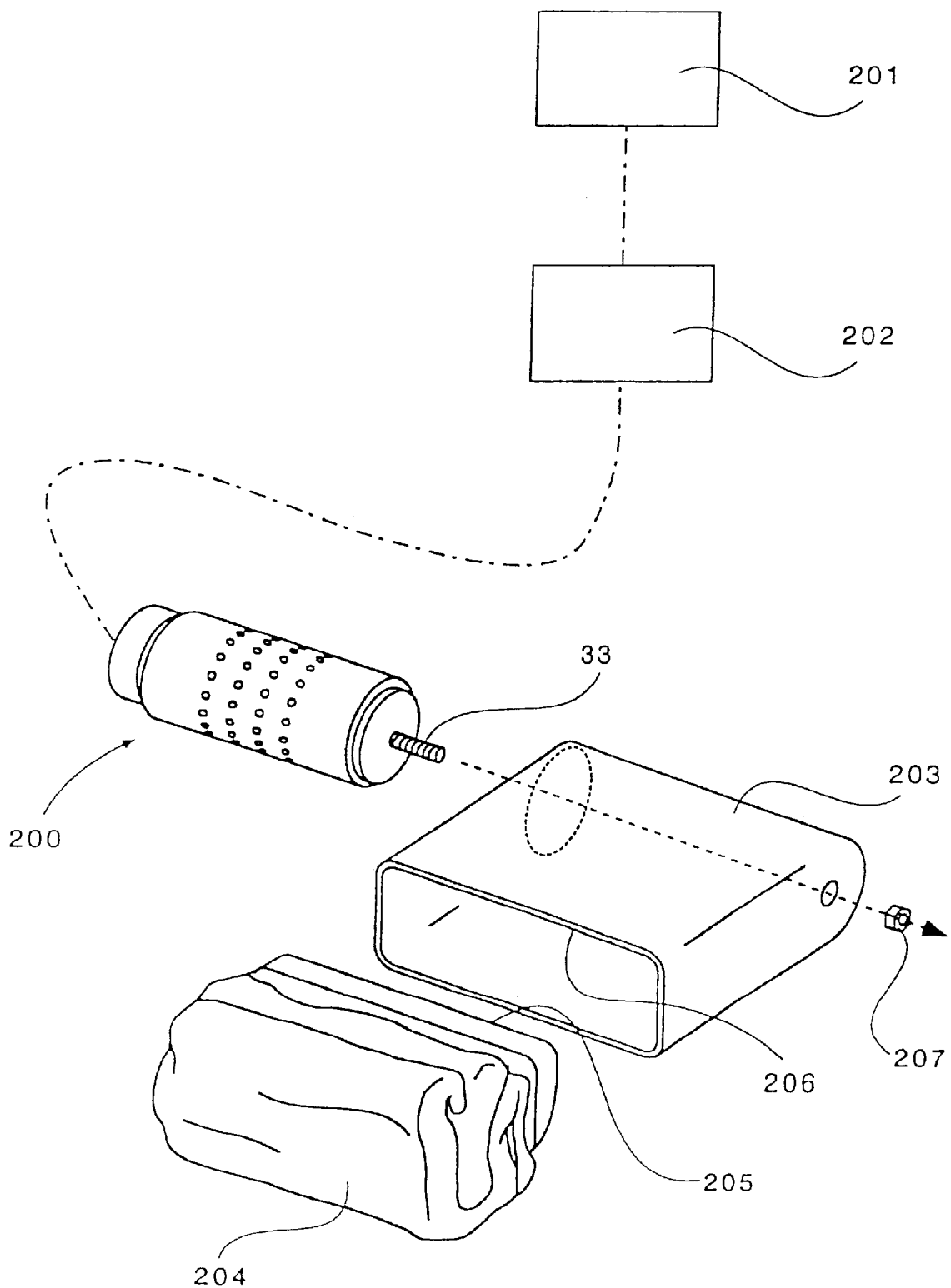
FIG. 3 is a constructional view illustrating an air bag system.
Figure 4:
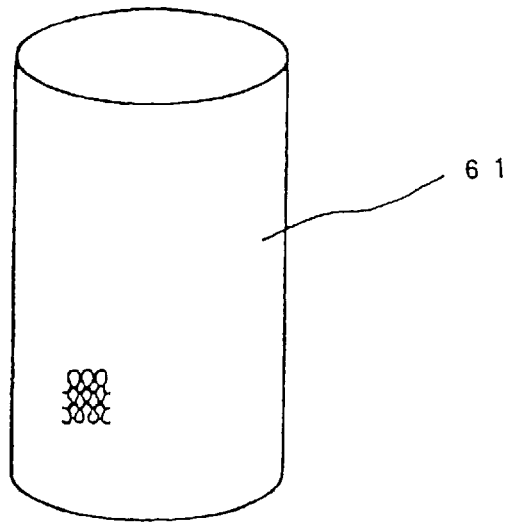
FIG. 4 is a perspective view illustrating a circular cylindrical wire mesh in the process of manufacture of the coolant/filter of the present invention.
Figure 5:
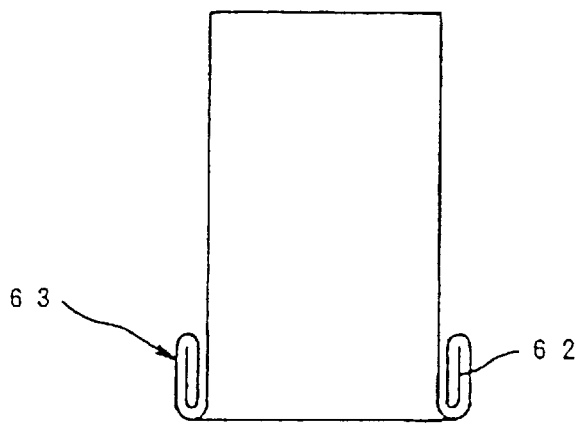
FIG. 5 is a rough sketch illustrating an annular laminate formed by repeatedly bending one end portion of the circular cylindrical member to the outside.
Figure 6:
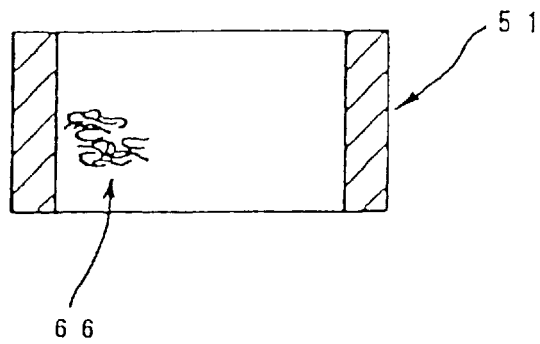
FIG. 6 is a schematic sectional view illustrating the coolant/filter of the present invention.
Figure 7:
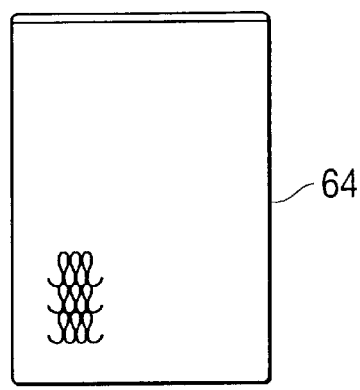
FIG. 7 is a rough sketch illustrating a plate member formed by radially pressing the circular cylindrical member such as that illustrated in FIG. 1.
Figure 8:
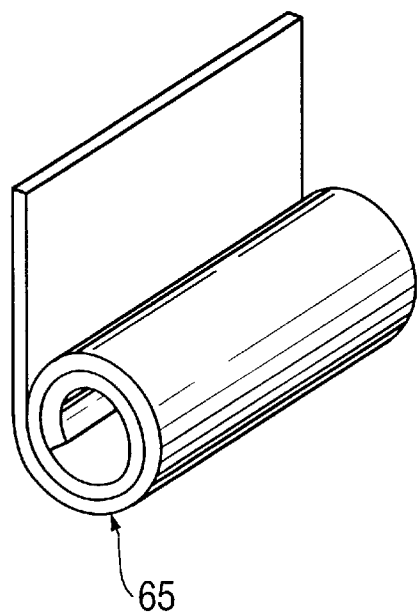
FIG. 8 is a rough sketch illustrating a laminate formed by winding up the plate member in a multiplex form into a cylindrical body.
Figure 9:
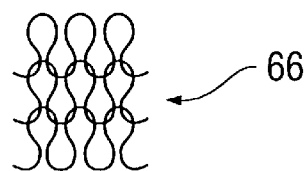
FIG. 9 is a line diagram illustrating a state of a plain knit.

FIG. 1 is a longitudinal sectional view illustrating a gas generator for air bag using a coolant/filter of the present invention. FIG. 2 is a longitudinal sectional view illustrating a gas generator for air bag using the coolant/filter according to another embodiment of the present invention. FIG. 3 is a constructional view illustrating an air bag system. FIG. 4 is a perspective view illustrating a circular cylindrical wire mesh in the process of manufacture of a single filter unit. FIG. 5 is a rough sketch illustrating an annular multi-layer portion formed by repeatedly bending one end portion of the circular cylindrical member to the outside. FIG. 6 is a schematic sectional view illustrating the single filter unit. FIG. 7 is a rough sketch illustrating a plate member formed by radially pressing the circular cylindrical member such as that illustrated in FIG. 4. FIG. 8 is a rough sketch illustrating a multi-layer element formed by rolling up the plate member in a multiplex form into a cylindrical body. And, FIG. 9 is a line diagram illustrating a state of a plain knit.

FIG. 1 is a longitudinal sectional view illustrating a gas generator for air bag using a coolant/filter of the present invention. The gas generator for air bag illustrated in this embodiment is one which is formed into a substantially cylindrical configuration that is long in the axial direction thereof. Especially, this gas generator is a gas generator for air bag which is suitable for use in an air bag system disposed on a passenger's seat side. A housing 1 of this gas generator is formed by press molding a stainless steel plate to form a cylindrical member 2 that is substantially cylindrical in shape and a cup-shaped member 3 that is substantially shaped like a cup, and inserting and fitting an end annulus portion 32 of the cup-shaped member 3 into the end opening 23 of the cylindrical member 2 and then welding and integrating the both to each other by laser welding. The cylindrical member 2 that constitutes this housing 1 is substantially shaped like a cylinder and, in a side surface 21 of one end thereof, a central opening 26 that accommodates igniting means is formed. Also, this central opening 26 has igniting means engagement portion 27 formed by bending in the axial direction of the housing 1. Also, the cylindrical member 2 has, on a circumferential wall 22, gas discharge ports 28 disposed in circumferential and axial directions and a crank-shaped portion 24 that forms a swollen circumferential portion 25 obtained by radially swelling the circumferential wall 22.

The cup-shaped member 3, inserted and fitted into the end opening 23 of the cylindrical member 2 is composed of the end flat surface portion 31 disposed opposing one end side surface 21 of the cylindrical member 2 and an end annulus portion 32 integrally formed on a circumferential edge of the end flat surface portion 31 and it is inserted into the end opening 23 of the cylindrical member 2. Further, at the center of the end flat surface portion 31 of the cup-shaped member 3, an attaching member 33, for attaching the gas generator, that extends in the axial direction of the cup-shaped member 3 is also formed.

And, within the housing 1 formed in this way, a coolant/filter 5 in a state of an outer periphery thereof opposing the inside of the circumferential wall surface of the housing 1 is disposed. The outer periphery of the coolant/filter 5 is abutted against and supported by expansion preventing means, i.e., a punching plate 6 which is shaped like a perforated circular cylinder having two or more rows of through holes, disposed in the circumferential direction of the circumferential wall. This coolant/filter 5 is formed by two filter units 51 each comprising a laminated wire mesh filter made by compression molding a wire mesh into a circular cylindrical configuration layered in the axial direction thereof, and the dimension of the coolant/filter 5 is regulated so that the ratio (L/D) of the length L to the inside diameter D may become not smaller than 1.

This filter unit 51 is manufactured as follows. First, a stainless steel wire having a diameter of 0.3 to 0.6 mm is plain knitted into a circular cylindrical member 61 such as that illustrated in FIG. 4. Next, one end portion 62 of this circular cylindrical member 61 is bent outward, as illustrated in FIG. 5, whereby this bending is repeatedly performed to form an annular multi-layer element 63. The frequency of the bending to be performed is determined by taking into consideration the diameter of the wire, the thickness of the filter unit, etc. Finally, this multi-layer element 63 is put into a mold (not illustrated) and is radially and axially compressed within the mold such that the bulk density becomes 3.0 to 5.0 g/cm$^3$, whereby the filter unit 51 such as that illustrated in FIG. 6 is obtained.

Another filter unit 51 forming method will be explained next with reference to FIGS. 7 and 8. After forming the circular cylindrical member 61 such as that illustrated in FIG. 4, this circular cylindrical member 61 is radially pressed to form a plate member 64 such as that illustrated in FIG. 7. By winding this plate member 64 in a multiplex form into a cylindrical configuration as illustrated in FIG. 8, a multi-layer element 65 is formed. This multi-layer element 65 is radially and axially compressed within a mold, whereby the filter unit 51 can be obtained.

In the filter unit 51 formed in this way, in each layer thereof, the loop-shaped meshes are of the state that the meshes are forcedly crushed, and these loop-shaped meshes are layered in the radial direction. As a result, the interspatial structure thereof becomes complex, whereby the resulting filter unit has excellent cooling effect and combustion residues catching effect. In the above-mentioned forming method, the filter unit can be obtained by performing the compression molding so as to have, at normal temperature, a pressure loss of $0.3 \times 10^{-2}$ to $1.5 \times 10^{-2}$ kg/cm$^2$, under a flow rate of 100 l/min/cm$^2$.

A filter unit having a two-layer structure can be obtained by inserting another multi-layer element inside the filter unit 51 and compression molding the resulting structure. This another multi-layer element can be formed by rolling the plate member 64, such as that illustrated in FIG. 7 comprising a wire mesh having a wire diameter of, for example, 0.5 mm, twice or so in such a way as is illustrated in FIG. 8.

Of the filter units 51 disposed adjacent to one another in the axial direction, the mating ones 51 thereof which are adjacent to each other in the axial direction abut each other at a position where no rows through holes in the punching plate 6 are formed. Since the outer periphery of the coolant/filter 5 is abutted against and supported by the punching plate 6, even if the coolant/filter 5 is expanded by the gaseous pressure of the combustion gas at a time of the operation of the gas generator, the mating filter units 51 contiguously joined to each other are not separated from each other and can be maintained reliably in a state of their abutting each other.

Figure 13:
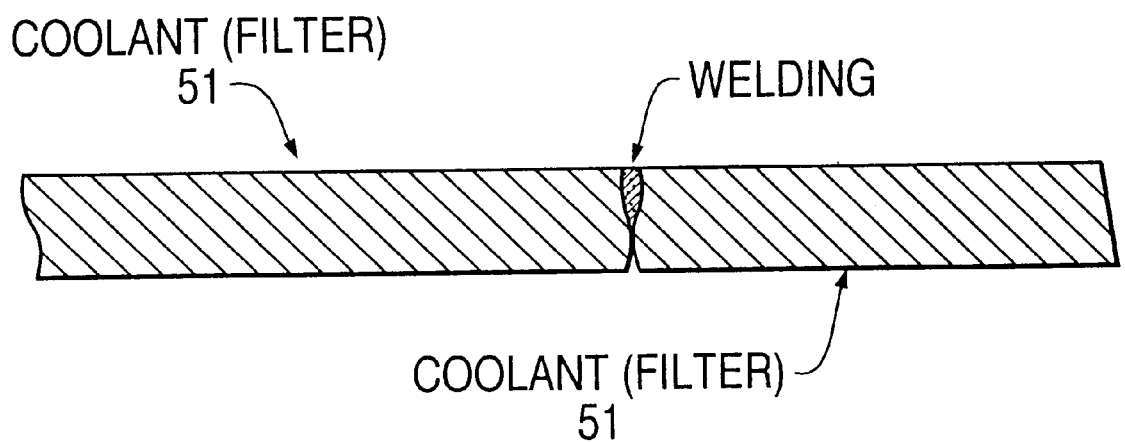
FIG. 13 is a schematic view showing two adjacent filter units being welded by an electron beam welding.

As shown in FIG. 13, the mating coolant/filters 51, 51 can be joined by an electron beam welding. It is to be noted that FIG. 13 is for illustrative purposes only and is not intended to infer a size, shape, etc.

Within the above-described housing, in addition to the coolant/filter 5 and punching plate 6, an igniter 4 functioning as the igniting means that operates in relation with the sensing of an impact, gas generating means, i.e., gas generating agent 7, that generates a combustion gas upon ignition by the igniting means, and a cushion member 9 supporting the gas generating means are accommodated. In order to prevent the entry of humidity from the outside into the housing, an aluminum tape 10 is adhered to the gas discharge ports 28 of the cylindrical member 2, thereby closing the gas discharge ports 28.

In the embodiment as illustrated in FIG. 1, the crank-shaped member 24 formed on the circumferential wall 22 of the cylindrical member 2 is constructed such that the swollen circumferential wall portion 25 is swollen in the radial direction of the cylindrical member 2 to the extent that corresponds to the thickness of the forward annulus portion 32 of the cup-shaped member 3. Therefore the coolant/filter 5 is supported by a portion of the inner surface of the circumferential wall 22 of the cylindrical member 2 having a smaller diameter and also by the inner surface of the end annulus portion 32 of the cup-shaped member 3, whereby a gap 8 is formed between the inner surface of the circumferential wall of the housing and the coolant/filter 5. Since this gap 8 functions as a gas passage, the generated gas can pass through the entire region of the coolant/filter 5, whereby the gas is effectively cooled and purified.

The gas generator is assembled by accommodating the igniter 4, the punching plate 6, the coolant/filter 5 and the gas generating agent 7 into the cylindrical member 2 and then closing the end opening of the cylindrical member by the cup-shaped member 3.

In the gas generator constructed in this way, when a impact is sensed by a sensor (not illustrated), the sensor signal is sent to the igniter 4, to operate this igniter 4. As a result, the gas generating agent 7 is ignited and burned to generate a combustion gas. Since the gap 8 formed outside the coolant/filter 5 functions as the gas passage, this combustion gas passes through the entire region of the coolant/filter 5 and, during this passing, the gas is effectively cooled and also has its combustion residues caught. Then, the combustion gas breaks the aluminum tape 10 adhered onto each of the gas discharge ports 28 and then the gas is jetted from the gas discharge ports 28. The gas jetted in this way flows into an air bag (not illustrated) to cause the expansion of the air bag and form a cushion between a passenger and a rigid structure.

The gas generator for air bag illustrated in FIG. 2 using the coolant/filter of the present invention has its coolant/filter 5 formed by axially juxtaposed two filter units 51 as in the case of the gas generator for air bag illustrated in FIG. 1. However, this gas generator illustrated in this embodiment differs from the gas generator for air bag illustrated in FIG. 1 in the way the cup-shaped member 3 is fitted to the cylindrical member 2 and the method of forming the gap 8 between the inner surface of the circumferential wall 22 of the cylindrical member 2 and the outer periphery of the coolant/filter 5. In the gas generator for air bag, as illustrated in this embodiment, the same cylindrical member as previously stated with reference to FIG. 1 is used as the cylindrical member 2. The end opening 23 is fitted into inside of the end annulus portion 32 of the cup-shaped member 3. Accordingly, the end annulus portion 32 of the cup-shaped member 3 according to this embodiment, cannot function as a spacer for forming the gap 8 by separating the inner surface of the circumferential wall 22 of the cylindrical member 2 and the outer periphery of the coolant/filter 5. For this reason, in this embodiment, in order to form the gap between the inner surface of the circumferential wall 22 of the cylindrical member 2 and the outer periphery of the coolant/filter 5, a spacer 11 is separately disposed therebetween. This spacer 11 preferably has a thickness that corresponds to the extent to which the swollen circumferential wall portion 5 protrudes in the radial direction of the cylindrical member 2. In this embodiment, in addition, the spacer 11 can be formed integrally with the end flat surface portion 31 of the cup-shaped member 3, whereby the edge of the end opening 23 of the cylindrical member 2 is inserted and fitted between the spacer 11 and the end annulus portion 32, after which the both are welded together.

In each of the gas generator for air bags, as illustrated in FIGS. 1 and 2, at the joining surface between the adjacent filter units disposed within the housing and juxtaposed in the axial direction thereof and constituting the coolant/filter, short pass preventing means can also be provided. As this short pass preventing means, for example, a ring-shaped graphite seal 52 disposed between the adjacent filter units 51 juxtaposed in the axial direction as illustrated in FIG. 10, a retainer such as that illustrated in each of FIGS. 11(*a*) to 11(*c*) sealing the joining surface between the filter units juxtaposed in the axial direction, an interfittable structure such as that illustrated in FIG. 12 wherein the joining end surfaces of the filter units juxtaposed by forming the joining surfaces of the adjacent filter units to be axially juxtaposed together into complementarily interfittable configurations, etc. can be used.

Figure 10:
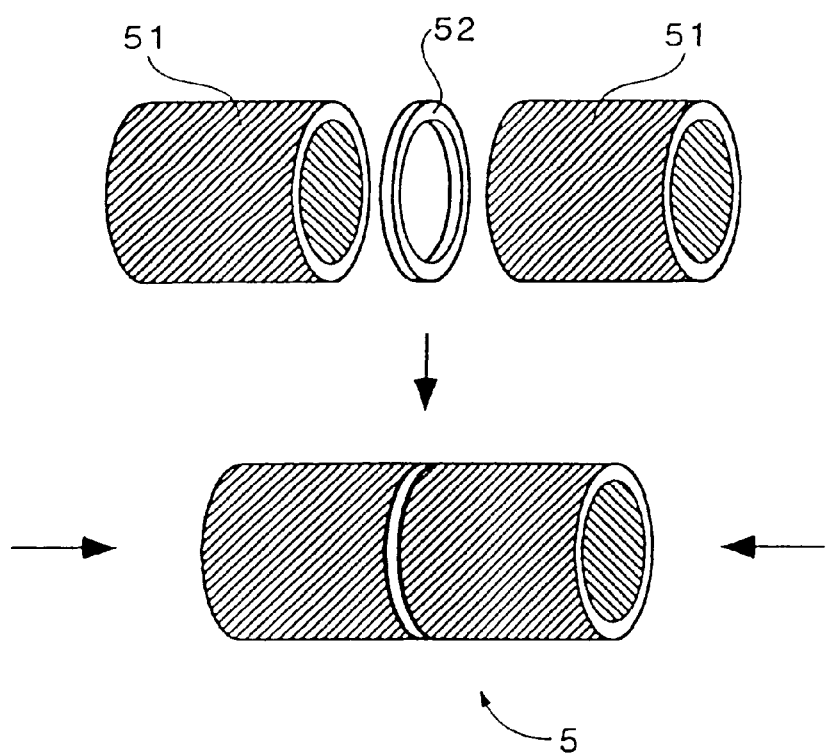
FIG. 10 is a rough sketch illustrating an example of a short pass preventing means.
Figure 12:
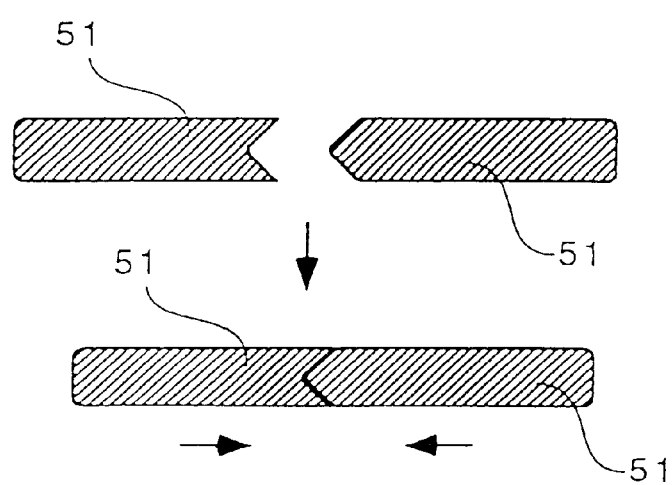
FIG. 12 is a rough sketch illustrating still another example of the short pass preventing means.
Figure 11:
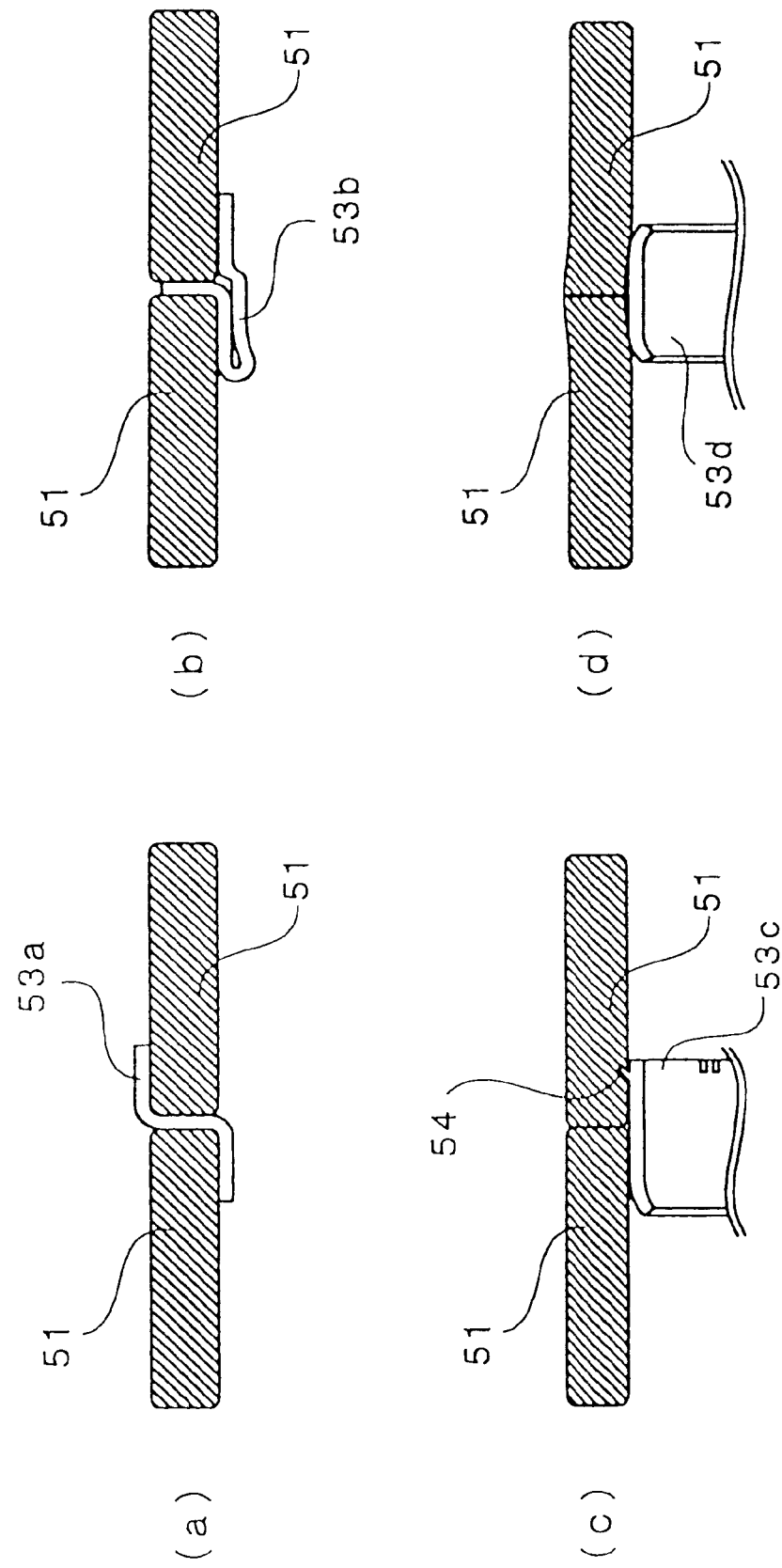
FIGS. 11(*a*) to 11(*d*) are rough sketches illustrating other examples of the short pass preventing means.

In a case where using the graphite seal 52 as the short pass preventing means, as illustrated in FIG. 10, it is preferable that the thickness thereof be a thickness having no hindrance to the filtering function. By disposing this graphite seal 52 between the filter units 51 and simply compressing these filter units, the leakage (short pass) of the gas from the joining surface of the adjacent filter units 51 can be prevented. Also, in a case where the retainer is used as the short pass preventing means, an annular retainer 53*a* prepared by substantially shaping the radial sectional configuration thereof like a crank as illustrated in FIG. 11(*a*), an annular retainer 53*b* formed by pinching one end thereof in between the adjacent filter units 51, bending the other end thereof and then forming the resulting other end in such a way as to cover from the inside the joining surface of the adjacent filter units 51 as illustrated in FIG. 11(*b*), an annular retainer 53*c* having an engagement pawl 54, wherein the engagement pawl 54 is engaged with either one of the adjacent filter units as illustrated in FIG. 11(*c*), or an annular retainer 53*d* which is annular and prepared by making the outside diameter thereof slightly larger than the inside diameter of the filter unit as illustrated in FIG. 11(*d*) can be used. Also, by forming the end surfaces of the adjacent filter units 51 into complementarily interfittable configurations, as illustrated in FIG. 12, the resulting interfittable structures can be also used as the short pass preventing means. If the end surfaces of the filter units 51 to be juxtaposed are each of a configuration in which it is complementarily interfittable with respect the opponent, the interfittable structure is not limited to the one illustrated in the drawing but can be also prepared, for example, by combining concavities and convexities with each other.

FIG. 3 illustrates an example of the air bag system having the gas generator according to the present invention. This air bag system comprises a gas generator 200, an impact sensor 201, a control unit 202, a module casing 203, and an air bag 204.

As the gas generator 200, substantially the same as the gas generator explained with reference to FIG. 1 is used, and, with a nut 207 to be screwed onto the attaching member 33 therefor, the resulting gas generator is fixed within the module casing 203.

The impact sensor 201 can comprise, for example, a semiconductor type acceleration sensor. This semiconductor type acceleration sensor is formed, on a silicon substrate beam arranged to be flexed when an acceleration is applied thereto, with four semiconductor distortion gauges. The four semiconductor distortion gauges are bridge connected. When an acceleration is applied, the beam is flexed with the result that a distortion occurs in the surface. Due to this distortion occurring, the resistance of the semiconductor distortion gauge varies and this variation in resistance is detected as a voltage signal that is proportional to the acceleration.

The control unit 202 is equipped with an ignition determining circuit, to which a signal from the impact sensor 201, such as the semiconductor type acceleration sensor, is input. At a point when the impact signal from the sensor 201 exceeds a certain value, the control unit 202 starts to perform its calculation. When the calculation result exceeds a certain value, the control unit 202 outputs an operation signal to the igniter of the gas generator 200 to operate the gas generator 200.

The module casing 203 is formed of, for example, polyurethane and, within this module casing, the air bag 204 and the gas generator 200 to construct a pad module are accommodated. This pad module is installed within a dash board (not illustrated) or the like of an automotive vehicle.

The air bag 204 is formed of, for example, a nylon (e.g. nylon 66) or a polyester and a bag opening 205 thereof is attached to an opening 206 of the module casing 203, whereby the air bag 204 is fixed within the module casing in a folded state.

When, at a time of collision of the automotive vehicle, the semiconductor type acceleration sensor 201 senses the impact, the impact signal is sent to the control unit 202. At a point when the impact signal from the sensor 201 exceeds a certain value, the control unit 202 starts to perform its calculation. Then, when the calculation result exceeds a certain value, the control unit 202 outputs an operation signal to the igniter of the gas generator 200. As a result of this, the igniter is operated to ignite and burn the gas generating agent to generate a gas. This gas is jetted into the interior of the air bag 204, whereby the air bag is inflated to the outside of the module casing 203 to form a cushion for absorbing the impact between a passenger and a vehicle structure such as a dash board.

According to the coolant/filter of the present invention, since this coolant/filter is formed by juxtaposing two or more filter units, each filter unit comprising a multi-layered wire mesh filter prepared by compression molding a plain knitted wire mesh into a circular cylindrical configuration juxtaposed two or more, adjustment of the density and weight thereof can be performed when forming the multi-layered wire mesh filter and, further, the coolant/filter becomes a coolant/filter that enables the enhancement in the freedom in configuration and as a result this coolant/filter becomes suitably usable also in the gas generator for air bag that is of a configuration long in the axial direction. Also, since, in this coolant/filter, it is possible to avoid the occurrence of an inconvenience of the spatial portions (meshes) of the wire mesh passing through the circular cylinder from the inside to the outside thereof due to the density of the wire mesh, cooling and purification of the combustion gas can be uniformly performed with a high efficiency.

Also, the gas generator that uses this coolant/filter enables highly efficient cooling and purification of the combustion gas.

What is claimed is:

1. A filter of a gas generator for an air bag, comprising:
   at least two filter units formed into a circular cylindrical configuration and being axially juxtaposed, wherein said at least two filter units includes short-pass preventing means for preventing combustion gas from escaping between an end of one of said at least two filter units and an end of an adjacent filter unit, said short-pass preventing means being integrally provided at opposing end surfaces of the adjacent filter units and having an interfittable structure such that the adjacent filter units are axially juxtaposed by interfitting joining surfaces of the adjacent filter units.

2. A filter of a gas generator for an air bag as set forth in claim 1, wherein at least one of the at least two filter units is prepared by compression molding a knitted wire mesh into the circular cylindrical configuration.

3. A filter of a gas generator for an air bag as set forth in claim 1, wherein the short pass preventing means is a ring-shaped graphite seal disposed between the adjacent filter units which are axially juxtaposed.

4. A filter of a gas generator for an air bag as set forth in claim 1, wherein the adjacent filter units are joined by welding.

5. A filter of a gas generator for an air bag as set forth in claim 1, wherein a ratio (L/D) of a length L of said filter units to an inside diameter D of the filter units is not smaller than 1.

6. A filter of a gas generator for an air bag, comprising:
   at least two filter units formed into a circular cylindrical configuration and being axially juxtaposed, a ratio (L/D) of a length L of said at least two filter units to an inside diameter D of said filter units being not smaller than 1; and
   a short-pass preventing means for preventing combustion gas from escaping between an end of one of said at least two filter units and an end of an adjacent filter unit and provided at opposing end surfaces of adjacent filter units, said short-pass preventing means being a retainer sealing the opposing end surfaces of adjacent filter units.

7. A gas generator for air bag, comprising:
   a housing having gas discharge ports;
   igniting means provided inside said housing, said igniting means being operated by an impact sensor upon sensing an impact;
   gas generating means provided inside said housing, said gas generating means being ignited by the igniting means to burn and generate a combustion gas; and
   a filter provided inside said housing, said filter at least one of cooling the combustion gas and catching the combustion residues, wherein the filter has,
   at least two filter units formed into a circular cylindrical configuration, said filter units being adapted to at least one of cooling the combustion gas and catching the combustion residues and axially juxtaposed and placed within a single combustion chamber of the gas generator,
   wherein the filter has its outer periphery abutted against and supported by expansion preventing means, and
   wherein the expansion preventing means is a punched plate shaped like a perforated circular cylinder, wherein two or more rows of through holes are arranged in the circumferential direction of a circumferential wall, whereby adjacent filter units adjacent to each other in the axial direction abut each other at a position where no rows of through holes in the punched plate are formed.

8. A gas generator for an air bag, comprising:

a housing having gas discharge ports;

igniting means provided inside said housing, said igniting means being operated by an impact sensor upon sensing an impact;

gas generating means provided inside said housing, said gas generating means being ignited by the igniting means to burn and generate a combustion gas; and a filter provided inside said housing, said filter at least one of cooling the combustion gas and catching the combustion residues, wherein the filter has, at least two filter units formed into a circular cylindrical configuration and being axially juxtaposed, a ratio (L/D) of a length L of said at least two filter units to an inside diameter D of said filter units being not smaller than 1, and short-pass preventing means for preventing combustion gas from escaping between an end of one of said at least two filter units and an end of an adjacent filter unit and provided at opposing end surfaces of adjacent filter units, said short-pass preventing means being a retainer sealing the opposing end surfaces of the adjacent filter units.

9. A gas generator for an air bag, comprising:

a housing having gas discharge ports;

igniting means provided inside said housing, said igniting means being operated by an impact sensor upon sensing an impact;

gas generating means provided inside said housing, said gas generating means being ignited by the igniting means to burn and generate a combustion gas; and a filter provided inside said housing, said filter at least one of cooling the combustion gas and catching the combustion residues, wherein the filter has, at least two filter units formed into a circular cylindrical configuration, said filter units being axially juxtaposed, and short-pass preventing means for preventing combustion gas from escaping between an end of one of said at least two filter units and an end of an adjacent filter unit, said short-pass preventing means being provided at an opposing end surfaces of adjacent filter units, wherein the short-pass preventing means is an interfittable structure formed at end surfaces of the adjacent filter units, in which the adjacent filter units are axially juxtaposed by interfitting the opposing end surfaces of the adjacent filter units.

10. A gas generator for an air bag set forth in claim 6, 1, 8, or 9, wherein at least one of said at least two filter units has its outer periphery abutted against and supported by expansion preventing means.

11. A gas generator for air bag comprising:

a housing having gas discharge ports;

igniting means provided inside said housing, said igniting means being operated by an impact sensor upon sensing an impact;

gas generating means provided inside said housing, said gas generating means being ignited by the igniting means to burn and generate a combustion gas; and a filter provided inside said housing, said filter at least one of cooling the combustion gas and catching the combustion residues, wherein the filter has, at least two filter units formed into a circular cylindrical configuration, said filter units being adapted to at least one of cooling the combustion gas and catching the combustion residues and axially juxtaposed and placed in a combustion chamber of the gas generator, wherein the filter has its outer periphery abutted against and supported by expansion preventing means, and wherein the expansion preventing means is a punched plate shaped like a perforated circular cylinder, wherein two or more rows of through holes are arranged in the circumferential direction of the circumferential wall, whereby adjacent filter units adjacent to each other in the axial direction abut each other at a position where no rows of through holes in the punched plate are formed.

* * * * *